US007562849B2

(12) United States Patent
Pitcher et al.

(10) Patent No.: US 7,562,849 B2
(45) Date of Patent: Jul. 21, 2009

(54) CURVED STAND DISPLAY ARRANGEMENT

(75) Inventors: David E Pitcher, Cambridge, MA (US); Thomas P Burrous, Haverhill, MA (US); Rebecca C. Stover, Lynn, MA (US); Alan L Stenfors, Satuate, MA (US); Sidney Rose, Marblehead, MA (US)

(73) Assignee: Rose Displays, Ltd., Salem, MA (US)

( * ) Notice: Subject to any disclaimer, the term of this patent is extended or adjusted under 35 U.S.C. 154(b) by 353 days.

(21) Appl. No.: 11/389,512

(22) Filed: Mar. 25, 2006

(65) Prior Publication Data

US 2007/0220794 A1 Sep. 27, 2007

(51) Int. Cl.
*F16M 13/00* (2006.01)

(52) U.S. Cl. .................................... 248/158; 40/606.01

(58) Field of Classification Search ................. 248/158, 248/473, 523, 524; 40/606.01, 606.17, 607.01, 40/738, 606.12; 362/221-225, 260, 270, 362/285, 296, 297; 312/140, 257.1, 263, 312/223.5; 52/271, 275, 276, 280, 282.2; 256/24, DIG. 5

See application file for complete search history.

(56) References Cited

U.S. PATENT DOCUMENTS

| | | | | | |
|---|---|---|---|---|---|
| 4,202,121 | A | * | 5/1980 | Maris et al. | 40/747 |
| 5,584,547 | A | * | 12/1996 | Trulaske, Sr. | 312/223.5 |
| 5,617,660 | A | * | 4/1997 | Pollack | 40/606.17 |
| 5,966,857 | A | * | 10/1999 | Pettersson et al. | 40/606.12 |

* cited by examiner

*Primary Examiner*—Korie Chan
(74) *Attorney, Agent, or Firm*—Don Halgren

(57) ABSTRACT

A curved stand display panel arrangement for supporting a curved display panel in an attractive and easily exchanged manner. The display panel arrangement comprises a first shelf and a second shelf spaced parallel and apart from one another. The first and second shelves having curved peripheries and corners. A support arrangement is secured between the shelves at their respective corners, wherein the support arrangement comprises a position-locked sleeve with panel engaging channels therein. A display panel has a pair of parallel edges inserted against a shoulder on the curved periphery of the shelves, and a pair of its edges are inserted into the parallel spaced apart channels in the sleeves.

13 Claims, 6 Drawing Sheets

CURVED STAND DISPLAY ARRANGEMENT

BACKGROUND OF THE INVENTION

1. Field of the Invention

The present invention relates to a stand for supporting one or more curved display panels supported between a lower plate and an upper plate to provide a robust presentation of that display panel.

2. Prior Art

Point-of-sales displays are utilized to attract customers to a particular site. Such displays need to be changed often as the products change and their closeness to the customer necessitates their need to be substantial and robust in appearance and easily set up in their displays.

Such point of sale displays having more than one display presented is important to attract customers from multiple sides. Aligning and displaying particular display signs accurately and easily is of paramount importance. Often such existing signs must be arranged in a time consuming and complicated manner, and to rely on threaded supports to close upon, support and align those sign displays.

It is an object of the present invention to overcome the disadvantages of the prior art.

It is a further object of the present invention to provide a curved stand to provide a rugged and robust appearance to a plurality of signs disposed therewith.

It is a further object of the present invention to provide an alignment arrangement for a curved stand which supports and aligns such display panels without unnecessary manipulation of threaded fasteners for that panel alignment.

It is still another object of the present invention to provide a method and apparatus for displaying a plurality of flexible panels in a simple and easily exchangeable manner.

BRIEF SUMMARY OF THE INVENTION

The present invention comprises a curved stand display panel arrangement for supporting one or more large flexible display panels in an attractive, simply supported and robust appearing manner. The present stand arrangement in a first embodiment thereof comprises a lower shelf and a cap or upper shelf, spaced apart and parallel to one another. In this preferred embodiment, the lower shelf and the cap shelf are juxtaposed in a vertical configuration. Each shelf has a plurality of corners at which a support arrangement is disposed. Each support arrangement is comprised of an inner rail and an outer sleeve.

In one preferred embodiment, each inner rail is supported at each respective end, to its respective lower shelf and to the cap shelf by a threaded member. Prior to attachment of the inner rail to the lower shelf and the cap shelf, the sleeve is slid over each respective inner rail. Each respective sleeve at least partially surrounds circumferentially its respective inner rail.

In a preferred embodiment of the curve stand arrangement, the lower shelf and the cap or upper shelf may be somewhat elongated in a configuration such as for example, an elongated oval shape. Further embodiments of this curve stand arrangement would comprise the lower shelf and the cap or upper shelf in a generally tri-cornered configuration or a four cornered configuration, each shelf having curved peripheries. In yet a further embodiment of the present invention, those curved peripheries could be concave in configuration (instead of convex) in a tri-cornered shelf arrangement thereat.

In a preferred form of the present invention, a central support post is disposed between the lower shelf and the cap shelf. The support post may have a lower base so as to support the curved display off of a floor.

The dimensions between any adjacent support arrangement are shorter than the width or side-support dimensions of any particular display panel supported therebetween. That is so, so as to provide the desired curved configuration to that display panel being supported between the support arrangements, whether those display panels are displayed in a convex or concave manner.

In a typical support arrangement disposed between the lower shelf and the cap shelf, the sleeve, of generally "omega" shape in cross-section, is slid about the inner rail. The inner rail may be round in cross section with a threaded receiving nut fixedly secured within each end thereof, so as to receive a threaded member from each respective shelf to permit attachment thereto. The sleeve, in its omega cross section, surrounds the periphery of the inner rail, by more than 180 degrees. Each sleeve has a pair of display panel receiving channels thereon. Each display panel receiving channel may be of V-shape or U-shape in the cross section. Each lower shelf and cap shelf has a display directed "inwardly" facing surface. Each facing surface has a peripheral shoulder disposed thereon for supporting an edge of the display panel thereagainst. Each facing surface is configured so as to have an engagement point which registers within each respective display panel receiving channel so that sleeve and its respective receiving channels will not move or twist with respect to the lower shelf or cap shelf, once the rails and their sleeves have been secured therebetween. Those display panel receiving channels also act as receiving slots for the edges of a display panel at each end thereof.

The assembly of the curved display arrangement is thus facilitated by the threaded members securing the inner rail to the lower shelf and the cap shelf. The sleeve is thus locked between the cap shelf and the lower shelf and is prevented from twisting or moving with respect to the lower rail by virtue of the engagement points on the facing surface of each respective shelf engaging the internal portion of the display panel receiving channel. Each respective support arrangement being close together than at least one of the dimensions (width or height) of any display panel effects the maintenance of the curvature of that display panel. The display panel is also reinforced by its support against the curved peripheral shoulder or panel support channels on the periphery (convex or concave) of each facing surface on each respective lower shelf and cap shelf.

While the preferred embodiment contemplates a cap shelf and a lower shelf having two peripheral edges meeting at apposed corners, and held in a spaced apart vertical orientation, further embodiments may include three corners or four corners each held horizontally spaced apart with curved peripheral edges on the respective cap shelves between the respective support arrangement at the corners thereof. In a further preferred embodiment that present invention, such cap shelf and lower shelf may be disposed in a vertical configuration spaced apart in a horizontal manner with a support post extending therebetween and holding it in that matter. In yet a further preferred embodiment of the present invention, those lower shelves and cap shelves may have concave peripheries, with at least three corners thereof defining the lower shelf and the upper shelf. In yet a further preferred embodiment, the shelves may be multi-tiered, that is, arranged with three or more spaced apart shelves, each with common shapes to their curved peripheries.

The invention thus comprises a curved stand display panel arrangement for supporting a curved display panel in an attractive and easily exchanged manner. The display panel arrangement comprises a first shelf and a second shelf spaced parallel and apart from one another. The first and second shelves have curved peripheries and at least two corners. A support arrangement is secured between the shelves at their respective corners, wherein the support arrangement comprises a position-locked sleeve with panel engaging channels therein. The support arrangement may comprise an elongated rail with said sleeve slideably disposed over said rail. The shelves preferably have an engagement point adjacent their respective corners, wherein the channels each mate with an engagement point of a shelf. The curved peripheries of said shelves preferably have a panel supporting shoulder thereon. The curved peripheries are preferably of convex shape. The curved peripheries may alternatively be of concave shape. The sleeve extends by more than 180 degrees about said rail therewithin, to prevent the sleeve from coming loose. The shelf has at least two curved sides. The shelf may have at least three sides. The panel engaging channels are preferably "V" shaped in cross section, to receive an edge of a display panel. The panel engaging channels may each have an inner edge which engages the rail for securement thereto. The panel engaging channels may each also have a further elongated flange portion which engages the rail for securement thereto.

The invention also comprises a method of supporting a flexible display panel comprising one or more of the steps of: securing a plurality of peripherally curved shelves together in shape-corresponding alignment by a plurality of support arrangements fastened between corners of adjacent shelves, wherein the support arrangements are spaced apart a distance which is less than the width of the flexible display panel, and inserting a lateral edge on each side of the display panel into a respective channel in the support arrangement for display of the panel. The method may also include forming the support arrangement from an inner rail and a sleeve slidable thereover, wherein each sleeve has the channel on a longitudinal edge thereof for receipt of the display panel, and locking the sleeve against rotation with respect to the shelf by matingly engaging an end of the channel of the sleeve against an engagement point of the shelf.

BRIEF DESCRIPTION OF THE DRAWINGS

The objects and advantages of the present invention will become more apparent, when viewed in conjunction with the following drawings in which.

DETAILED DESCRIPTION OF THE PREFERRED EMBODIMENTS

Figure 1:
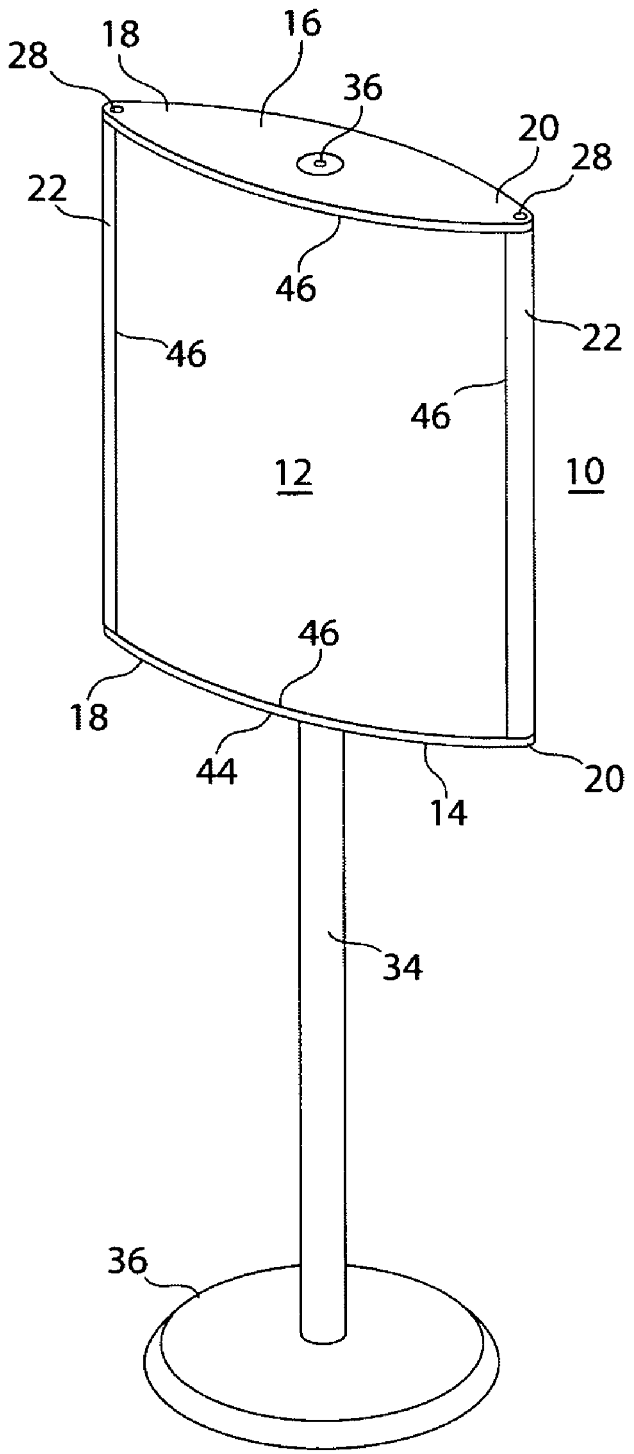
FIG. 1 is a perspective view of a curved stand arrangement constructed according to the principals of the present invention.

Referring now to the drawings in detail, and particularly to FIG. 1, there is shown the present invention which comprises a curved stand display panel arrangement 10 for supporting one or more large flexible display panels 12 in an attractive, simply supported and robust appearing manner. The present stand arrangement 10 in a first embodiment thereof comprises a lower shelf 14 and a cap or upper shelf 16, spaced apart and parallel to one another. In this preferred embodiment, shown in FIGS. 1 and 2, the lower shelf 14 and the cap shelf 16 are juxtaposed in a vertical configuration. Each shelf 14 and 16 has a plurality of corners 18 and 20 at which a support arrangement 22 is disposed. Each support arrangement 22 is comprised of an inner rail 24 and an outer sleeve 26, as seen in FIGS. 2 and 3.

Figure 2:
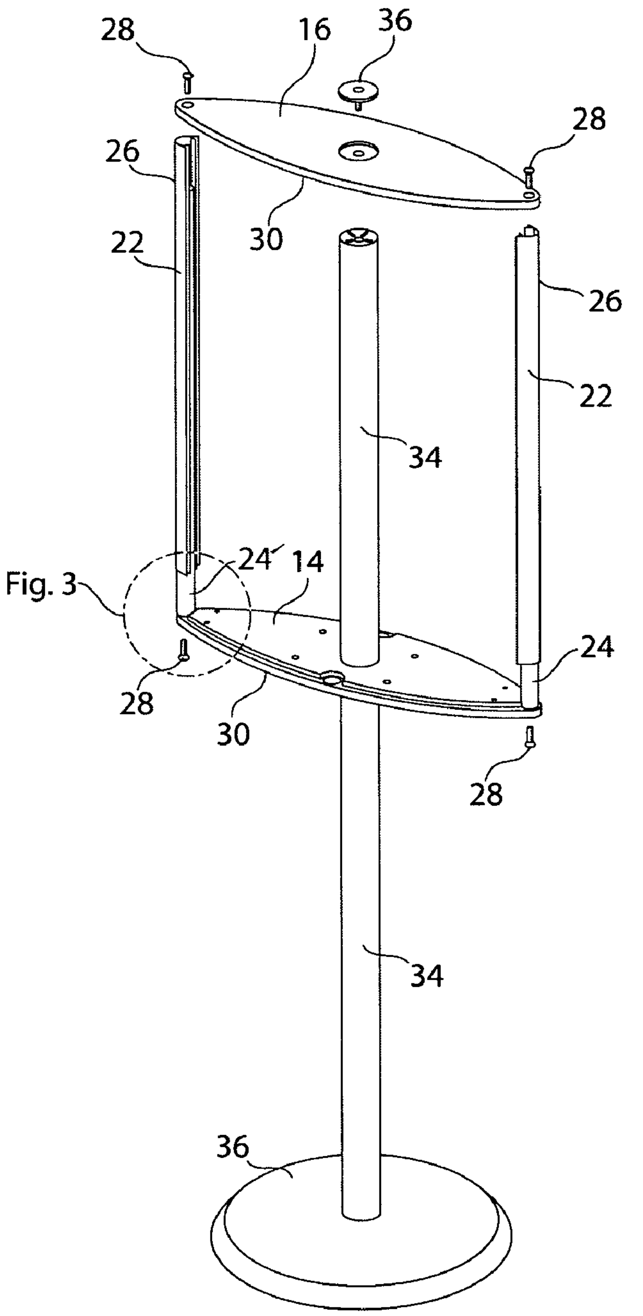
FIG. 2 is a view similar to FIG. 1, in an exploded configuration, without a particular display panel disposed therein.
Figure 3:
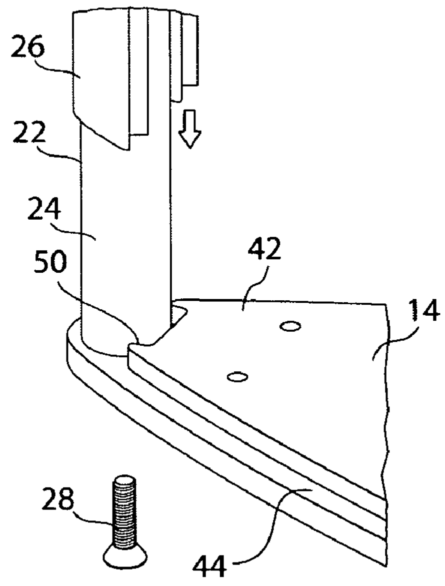
FIG. 3 is an enlarged, exploded view of a support arrangement and lower shelf area designated "A" shown in FIG. 2.

In one preferred embodiment, each inner rail 24 is supported at each respective end, to its respective lower shelf 14 and to the cap shelf 16 by a threaded member 28, as shown in FIGS. 2 and 3. Prior to attachment of the inner rail 24 to the lower shelf 14 and the cap shelf 16, the sleeve 26 is slid over each respective inner rail 24, as represented in FIGS. 2 and 3. Each respective sleeve 26 at least partially surrounds circumferentially its respective inner rail 24, as best represented in FIGS. 6 and 7.

Figure 6:
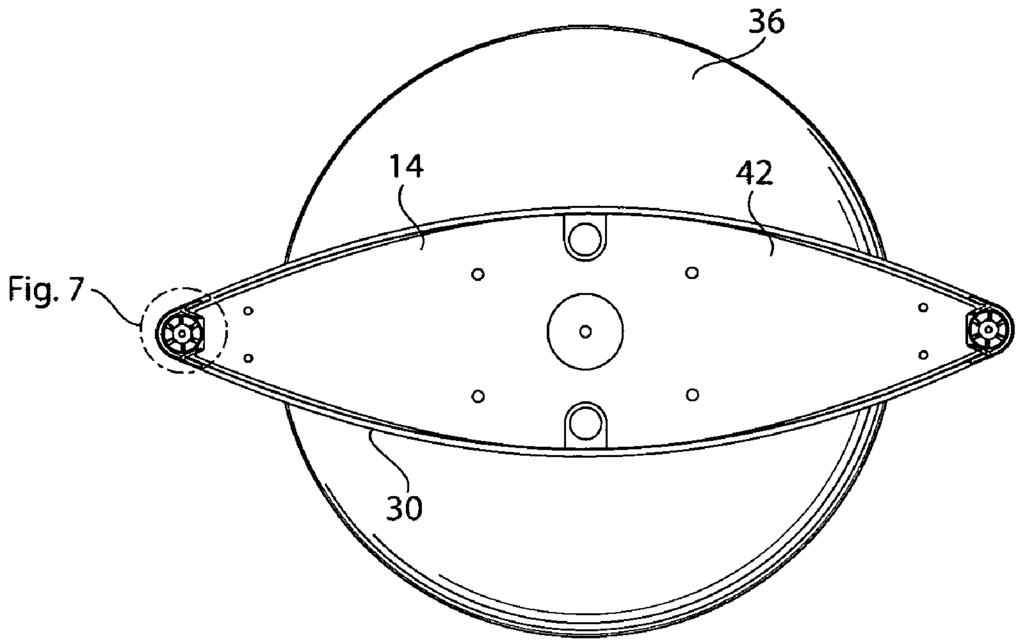
FIG. 6 is a view taken along the lines 6-6 of FIG. 4.
Figure 7:
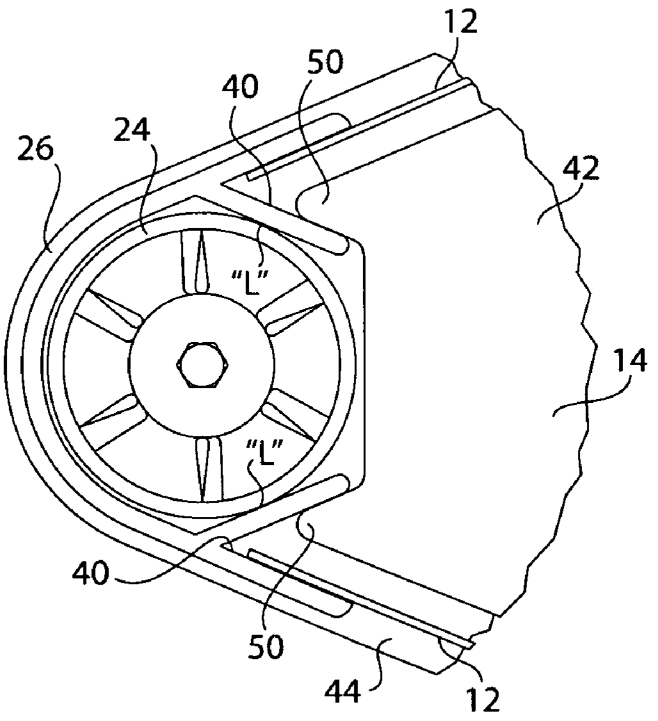
FIG. 7 is an enlarged plan view of the area designated "C" of the support arrangement shown in FIG. 6.
Figure 8:
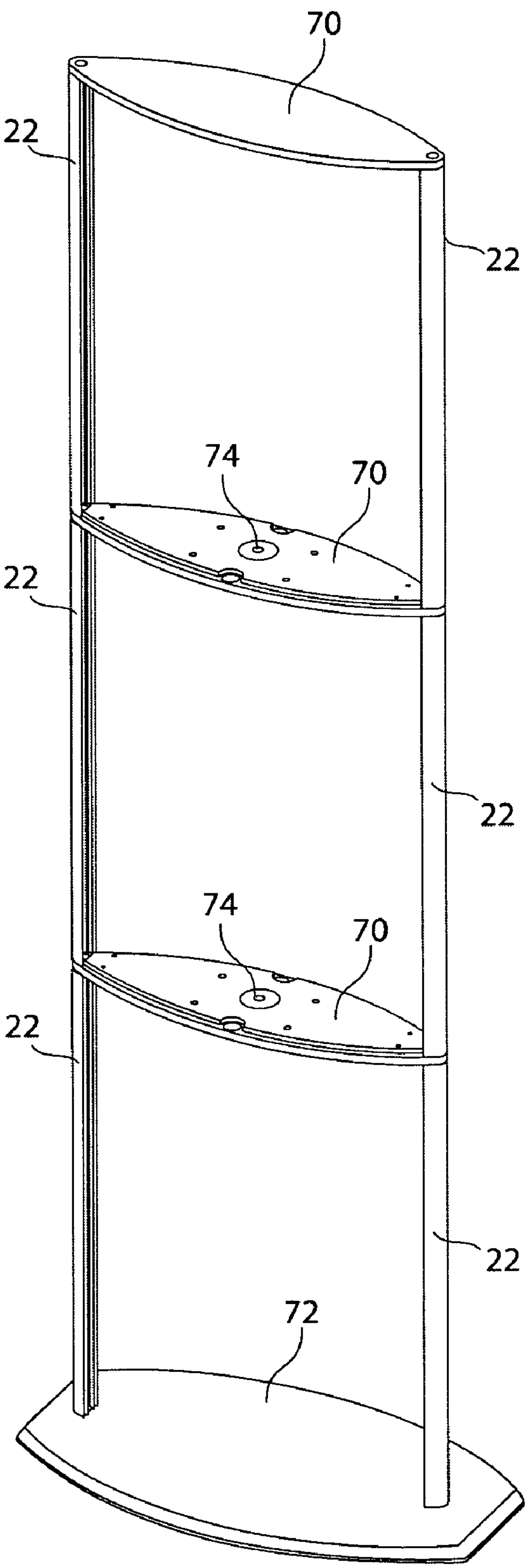
FIG. 8 is a perspective view of a further embodiment of a shelf, wherein a plurality (more than two) of commonly curved shelves are shown spaced apart, and supported at their corresponding corners by a support arrangement.

In a preferred embodiment of the curve stand arrangement 10, the lower shelf 14 and the cap or upper shelf 16 may be somewhat elongated in a configuration such as for example, an elongated oval shape as best represented in FIG. 6, having curved side portions or peripheries 30. Further embodiments of this curve stand arrangement 10 would comprise the lower shelf 14 and the cap or upper shelf 16 in a generally tri-cornered configuration or a four cornered configuration, each shelf having curved peripheries. In yet a further embodiment of the present invention, those curved peripheries could be concave, as represented in FIG. 8 in configuration (instead of convex) in a tri-cornered shelf arrangement thereat.

Figure 4:
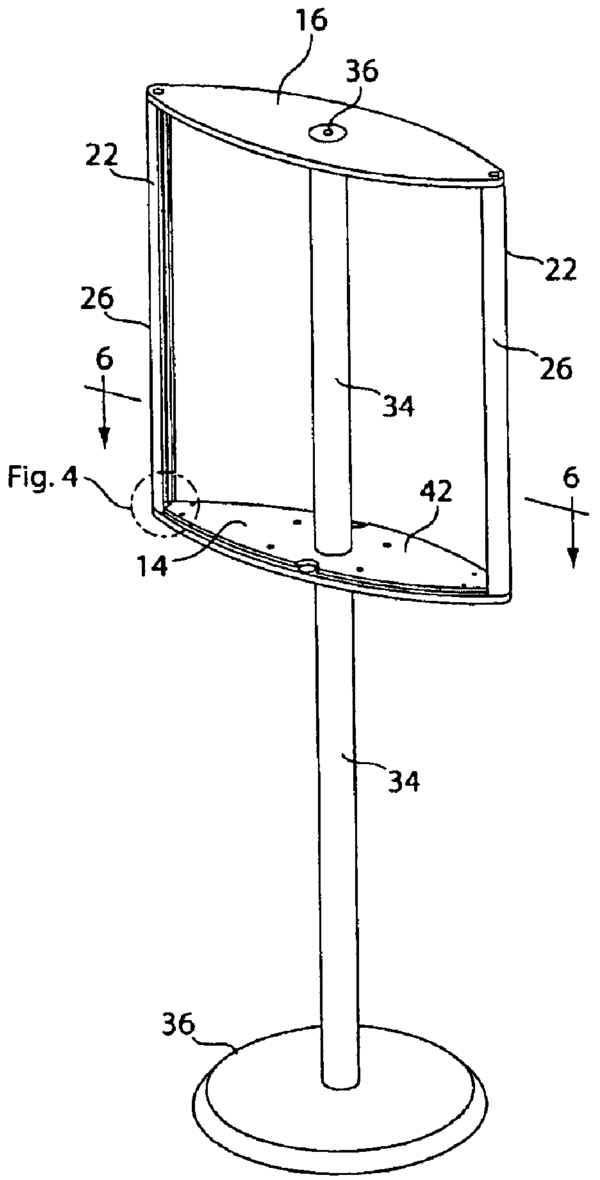
FIG. 4 is a view similar to FIG. 1 showing the curved stand assembled, without a display panel inserted therein.

In a preferred form of the present invention, a central support post 34 is disposed between the lower shelf 14 and the cap shelf 16, as shown in FIG. 1, attached by a threaded member 36. The support post 34 may extend through the lower shelf 14, and have a lower base 36 so as to support the curved display arrangement 10 from a floor, as shown in FIG. 4.

The dimensions between adjacent support arrangement 22 and 22 are shorter than the width or side-support dimensions of any particular display panel 12 supported therebetween. That is so, so as to provide the desired curved configuration to that display panel 12 being supported between the support arrangements 22 and 22, whether those display panels 12 are displayed in a convex or concave manner.

Figure 5:
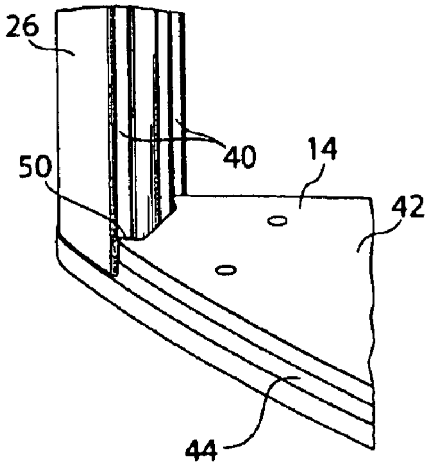
FIG. 5 is an enlarged detailed view of the support arrangement on a corner of the lower shelf area designated "B" shown in FIG. 4.

In a typical support arrangement 22 disposed between the lower shelf 14 and the cap shelf 16, the sleeve 26, of generally "omega" shape in cross-section as represented in FIG. 7, is slid about the inner rail 24, as represented in FIG. 2. The inner rail 24 may be round in cross section, as shown in FIGS. 6 and 7, with a threaded receiving nut fixedly secured within each end thereof, so as to receive a threaded member 28 from each respective shelf 14 and 16, to permit attachment thereto. The sleeve 26, in its omega cross section, surrounds the periphery of the inner rail 24 by more than 180 degrees, and contacts that rail 24 at two lines of contact, each designated "L", as represented in the plan view of FIG. 7 as a point. The surrounding of the rail 24 by the sleeve 26 by more than 180 degrees insures locking of the components together, and stability to a display panel supported therewithin. Each sleeve 26 has a pair of display panel receiving channels 40 thereon. Each display panel receiving channel 40 may be generally of V-shape or U-shape in the cross section, as represented in FIG. 7. Each lower shelf 14 and cap shelf 16 has a display directed "inwardly" facing surface 42. Each facing surface 42 has a peripheral shoulder 44 disposed thereon, as shown in FIGS. 3 and 5, the shoulder 44 arranged for supporting an edge46 of the display panel 12 thereagainst. Each facing surface 42 is configured so as to have a raised engagement point 50 which registers within each respective display panel receiving channel 40, as presented in FIGS. 5 and 7, so that sleeve 26 and its respective receiving channels 40 will not move or twist with respect to the lower shelf 14 or the cap shelf 16 once the rails 24 and their sleeves 26 have been secured therebetween. Those display panel receiving channels 40 also act as receiving slots for the edges 46 of a display panel 12 at each end thereof.

The assembly of the curved display arrangement 10 is thus facilitated by the threaded members securing the inner rail 24 to the lower shelf 14 and the cap shelf 16. The sleeve 26 is thus locked between the cap shelf 16 and the lower shelf 14 and is prevented from twisting or moving with respect to the rail 24 by virtue of the engagement points 50 on the facing surface 42 of each respective shelf 14 and 16 engaging the internal portion of the display panel receiving channel 40. Each respective support arrangement 22 being close together than at least one of the dimensions (width or height) of any display panel 12 effects the maintenance of the curvature of that display panel 12. The display panel 12 is also reinforced by its support against the curved peripheral shoulder 44 or panel support channels 40 on the periphery (convex or concave) of each facing surface 42 on each respective lower shelf 14 and cap shelf 16.

A further embodiment of the curved panel display stand 10 is shown in FIG. 8, wherein more than two commonly shaped shelves 70 are separated and supported by mating support arrangements 22 as recited and described hereinabove. This multi-tiered embodiment of the display stand 10 has a base 72 for its own support. Successive tiers could be also be rotated about a shelf pivot joint 74, with the particular shelves affected being multi-layered themselves to effect a circumferentially disposed display panel.

Figure 9A:
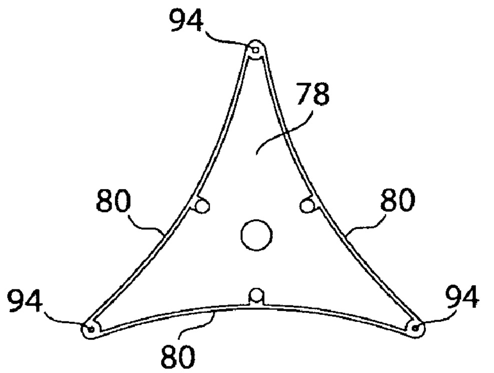
FIGS. 9A-9D show further embodiments of shelf configurations with various embodiments of curved side portions.
Figure 9B:
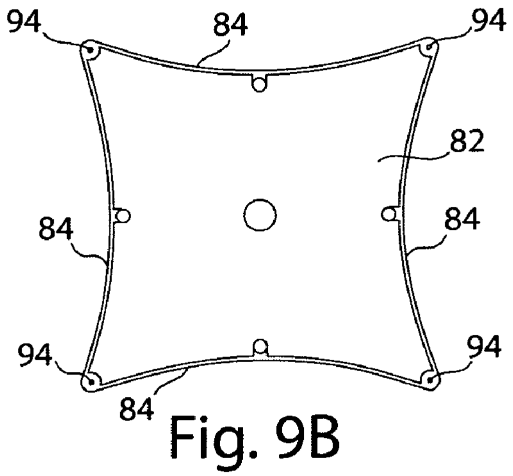
Figure 9C:
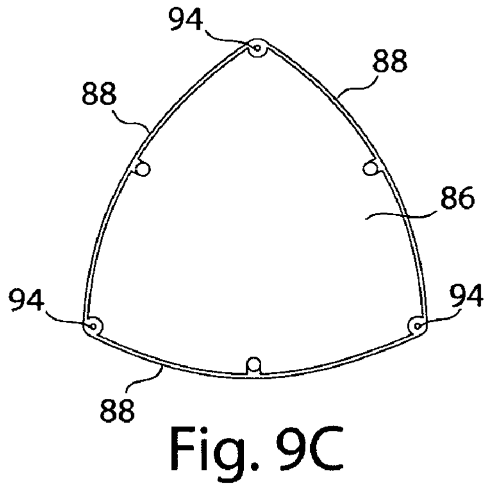
Figure 9D:
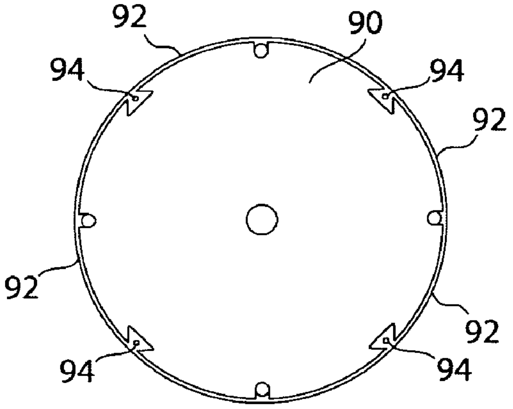

A further embodiment of the shape of the shelves is shown in FIGS. 9A through 9D, FIG. 9A shows a "three-sided" shelf 78 with three concave sides 80 thereon. FIG. 9B shows a "four-sided" shelf 82 with four concave sides 84 thereon. FIG. 9C represents a "three-sided" shelf 86 with three convex sides 88 thereon. FIG. 9D represents a "four-sided" of "n" sided shelf 90 with four or "n" sides 92 thereon. Each of the sides 80, 84, 88 and 92 will have support arrangements 22 at their respective "corners" 94, when assembled into a support stand.

Figure 10A:
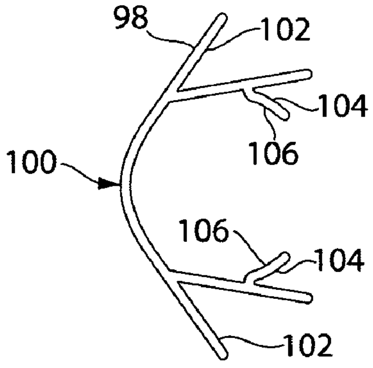
FIGS. 10A and 10B show further embodiments of the sleeve components of the shelf support arrangements.
Figure 10B:
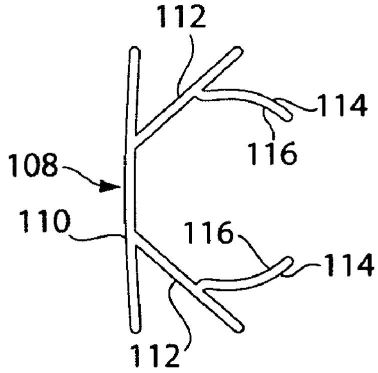

The sleeve component for various support arrangements are shown in FIGS. 10A and 10B. The sleeve 98, shown in FIG. 10A has a curved back portion 100 and a first channel 102 and a second channel 104. The second channel 104 has an elongated portion 106 which functions to wrap around a rail by more than 180 degrees. The sleeve 108, shown in FIG. 10B has a generally flat back portion 110 and a first channel 112 and a second channel 114. The second channel 114 has an elongated flange portion 116 which functions to wrap around a rail (when assembly into a support arrangement) by more than 180 degrees.

While the preferred embodiment contemplates a cap shelf and a lower shelf having two peripheral edges meeting at apposed corners, and held in a spaced apart vertical orientation, other further preferred embodiments may include three corners or four corners each held in a horizontally spaced apart manner with curved peripheral edges on the respective cap shelves between the respective support arrangement at the corners there. In a further preferred embodiment that present invention, such cap shelf and lower shelf may be disposed in a vertical configuration spaced apart in a horizontal manner with a support post extending therebetween and holding it in that matter. In yet a further preferred embodiment of the present invention, those lower shelves and cap shelves may have concave peripheries, as represented in FIG. 8, with at least three corners thereof defining for example, the lower shelf and the upper shelf.

We claim:

1. A curved stand display panel arrangement for supporting a plurality of curved display panels in an attractive and easily exchanged manner, said display panel arrangement comprising:

- a first shelf and at least a second shelf spaced parallel and apart from one another, said first and second shelves having curved peripheries and corners;
- a support arrangement secured between said shelves at their respective corners for supporting curved display panels between those corners, wherein each support arrangement comprises an elongated internal rail connected to the first shelf and the second shelf, with a position-locked sleeve having a pair of display-panel directed panel-engaging channels thereon, the sleeve being slidably disposed over the rail.

2. The curved stand display panel arrangement as recited in claim 1, wherein said shelves have an engagement point adjacent their respective corners, wherein said channels each mate with an engagement point of a shelf.

3. The curved stand display panel arrangement as recited in claim 1, wherein said curved peripheries of said shelves have a panel supporting shoulder thereon.

4. The curved stand display panel arrangement as recited in claim 1, wherein said curved peripheries are of convex shape.

5. The curved stand display panel arrangement as recited in claim 1, wherein said curved peripheries are of concave shape.

6. The curved stand display panel arrangement as recited in claim 1, wherein said sleeve extends more than 180 degrees about said rail therewithin, to prevent said sleeve from coming loose.

7. The curved stand display panel arrangement as recited in claim 4, wherein said shelf has at least two curved sides.

8. The curved stand display panel arrangement as recited in claim 5, wherein said shelf has at least three sides.

9. The curved stand display panel arrangement as recited in claim 1, wherein said panel engaging channels are "V" shaped in cross section, to receive an edge of a display panel.

10. The curved stand display panel arrangement as recited in claim 6, wherein said panel engaging channels each have an inner edge which engages said rail for securement thereto.

11. The curved stand display panel arrangement as recited in claim 6, wherein said panel engaging channels each have a further elongated flange portion which engages said rail for securement thereto.

12. A method of supporting a plurality of flexible curved display panels, comprising:

- securing a plurality of peripherally curved shelves together in shape-corresponding alignment by a plurality of parallel, transversely adjacent support arrangements fastened between respective corners of adjacent shelves wherein said support arrangements are spaced apart a distance which is less than the width of said flexible display panels to effect the curvature of the display panels;

inserting a lateral edge on each side of said display panels into a respective channel in each transversely adjacent support arrangement for curved display of said panels; and forming each support arrangement from an inner rail connected to the plurality of curved shelves and a sleeve slidable thereover, wherein each sleeve has a pair of channels on a longitudinal edge thereof, wherein each of the channels on a sleeve is arranged for receipt of one side edge of a curved display panel.

13. The method of claim 12, including:

locking said sleeve against rotation with respect to said shelf by matingly engaging an end of said channel of said sleeve against an engagement point of said shelf.

* * * * *